United States Patent [19]

Aiki

[11] Patent Number: 4,726,454

[45] Date of Patent: Feb. 23, 1988

[54] CLUTCH DISK FOR PRODUCING A STABLE HYSTERESIS

[75] Inventor: Shigetaka Aiki, Kariya, Japan

[73] Assignee: Aisin Seiki Kabushiki Kaisha, Kariya, Japan

[21] Appl. No.: 912,376

[22] Filed: Sep. 29, 1986

[30] Foreign Application Priority Data

Sep. 30, 1985 [JP]  Japan .................................. 60-216396

[51] Int. Cl.$^4$ ................................................ F16D 3/14
[52] U.S. Cl. .................................... 192/106.2; 464/68
[58] Field of Search ............... 192/106.1, 106.2, 70.17, 192/70.18, 110 S; 464/64, 68, 81, 66

[56] References Cited

U.S. PATENT DOCUMENTS

| | | | |
|---|---|---|---|
| 4,185,728 | 1/1980 | Gatewood ........................ | 192/106.2 |
| 4,212,380 | 7/1980 | Billet .............................. | 192/106.2 |
| 4,494,642 | 1/1985 | Hashimoto ...................... | 192/106.2 |
| 4,564,097 | 1/1986 | Kabayama ................... | 192/106.2 X |
| 4,634,397 | 1/1987 | Beccaris et al. ............. | 192/106.2 X |

FOREIGN PATENT DOCUMENTS 2242606  3/1975  France .............................. 192/106.2
2496210  6/1982  France .

*Primary Examiner*—George H. Krizmanich
*Attorney, Agent, or Firm*—Burns, Doane, Swecker & Mathis

[57] ABSTRACT

A clutch disk is provided of the type comprising a hub to be coupled with a torque output shaft, an inner hub flange fixed integrally to the hub, an outer hub flange disposed concentrically on the outside of the inner hub flange so that it can rotate within the extent of a predetermined angle by means of splines with respect to the inner hub flange, main and auxiliary disk plates disposed on each side of both the flanges which are to be coupled with a torque input shaft, and provision for a hysteresis effect including thrust material provided between the flanges and the main and auxiliary disk plates, which is characterized in that plate material for covering a torsion section cutout and a spline section formed between the inner and outer hub flanges is disposed between the thrust material for providing the hysteresis effect and both the hub flanges, and the plate material has a fixing section for making the plate material rotate together with the inner hub flange, whereby a stable hysteresis is obtained.

4 Claims, 10 Drawing Figures

CLUTCH DISK FOR PRODUCING A STABLE HYSTERESIS

BACKGROUND OF THE INVENTION

1. Field of the Invention

This invention relates to a clutch disk and, more particularly, to a split hub type clutch disk.

2. Description of the Prior Art

Split hub type clutch disk is well known in the art in which a hub flange is split into inner and outer flanges. This type of clutch disk is composed of a hub to be coupled with a torque output shaft, an inner hub flange fixed integrally to the hub, an outer hub flange disposed concentrically on the outside of the inner hub flange so that it can rotate within the extent of a predetermined angle by means of splines with respect to the inner hub flange, main and auxiliary disk plates disposed on each side of both the flanges which are to be coupled with a torque input shaft, and hysteresis means including thrust material provided between the flanges and the main and auxiliary disk plates.

According to such a configuration as above, since the thrust material of the hysteresis means covers the spline sections of the inner and outer hub flanges, it is in friction engagement with the sides of the spline teeth. Hence, friction surfaces are created on the respective sides of the inner and outer hub flanges, but, it is uncertain on which of the inner and outer hub flanges the thrust material slides, thus, the hysteresis of the torque transfer characteristic of the clutch disk is unstable. Further, since the thrust material is scratched by the edges of the spline teeth, this makes the hysteresis more unstable.

SUMMARY OF THE INVENTION

It is an object of the present invention to provide a clutch disk which produces a stable hysteresis.

To achieve the foregoing object, the present invention provides a clutch disk of the type comprising a hub to be coupled with a torque output shaft, an inner hub flange fixed integrally to the hub, an outer hub flange disposed concentrically on the outside of the inner hub flange so that it can rotate within the extent of a predetermined angle by means of splines with respect to the inner hub flange, main and auxiliary disk plates disposed on each side of both the flanges which are to be coupled with a torque input shaft, and hysteresis means including thrust material provided between the flanges and the main and auxiliary disk plates, which is characterized in that plate material for covering a torsion section cutout and a spline section formed between the inner and outer hub flanges is disposed between the thrust material of the hysteresis means and both the hub flanges, and the plate material has a fixing section for making the plate material rotate together with the inner hub flange.

The plate material fixing section is preferably formed by its flat inner peripheral surface adjacent to the bottom of the torsion section cutout of the inner hub flange. Alternatively, the plate material fixing section is preferably formed by a pawl member integral with the plate material which is laid on the flat outer peripheral surface of the hub being flush with the bottom of the torsion section cutout of the inner hub flange. In a further embodiment, the plate material fixing section is preferably formed by a squeezed projection section being locked on the side of the tops of the spline section of the inner hub flange.

Owing to the foregoing configuration, the thrust material out of the hysteresis means does not contact with the sides of the spline teeth of the inner and outer hub flanges, but frictionally slides on the plate material interposed therebetween, and the plate material rotates integrally together with the inner hub flange. Hence, friction occurs between the plate material and the thrust material and a stable hysteresis is obtained, thereby the advantage being provided that the lifetime of the thrust material, as well as others, is prolonged.

DESCRIPTION OF THE PREFERRED EMBODIMENTS

A clutch disk according to the present invention will now be described with reference to the drawings.

Figure 1:
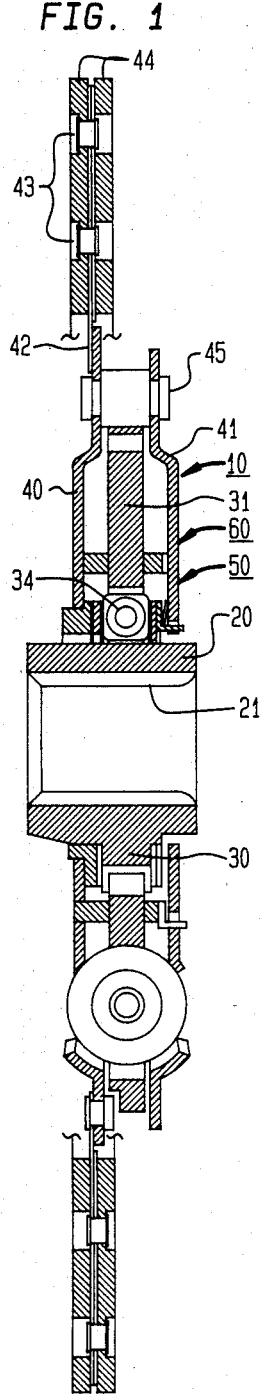
FIG. 1 is a sectional view showing a clutch disk according to the present invention, taken along line I—I in FIG. 3.
Figure 3:
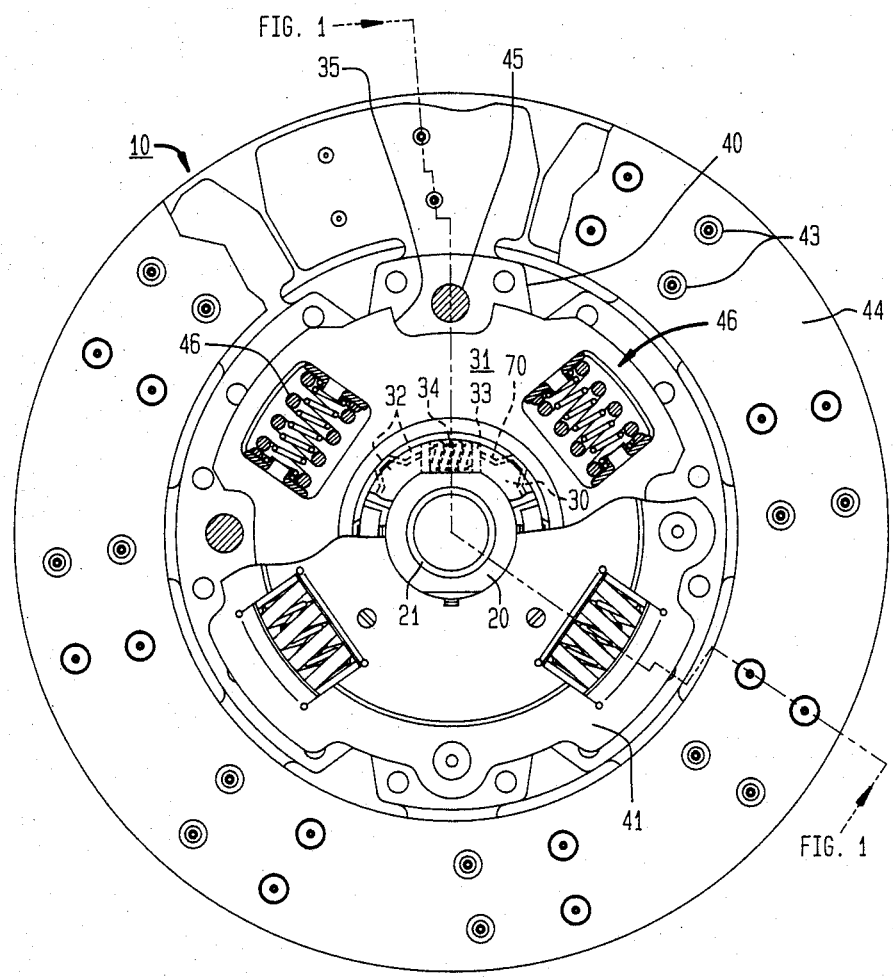
FIG. 3 is a side view, with portions broken away, of the clutch disk according to the present invention.
Figure 10:
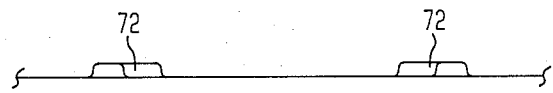
FIG. 10 is a fragmentary enlarged view showing the squeezed state of the plate material.

The present clutch disk 10 is, as shown in FIGS. 1 and 3, composed of a hub 20 to be coupled with an output shaft (not shown), an inner hub flange 30 and an outer hub flange 31 disposed concentrically with respect to the hub 20, a main disk plate 40 and an auxiliary plate 41 provided on each side of both the hub flanges 30 and 31 and disposed concentrically and relatively rotatably with respect to the hub, and a hysteresis unit 50 disposed between the main and auxiliary plates 40 and 41 and the hub flanges 30 and 31.

Figure 5:
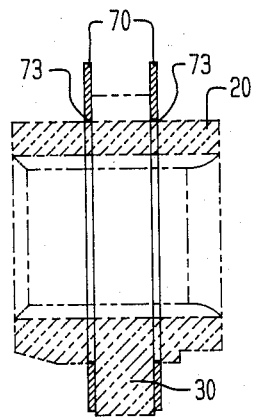
FIG. 5 is a sectional view corresponding to FIG. 4.

In FIG. 1, a spline 21 is provided on the inside of the hub 20, with which the torque output shaft (not shown) is coupled. On the outer peripheral surface of the hub 20 is integrally provided the inner hub flange 30 (illustrated by the imaginary line in FIGS. 5, 7 and 9), and on the outside of the inner hub flange 30 is concentrically disposed the outer hub flange 31. These inner and outer hub flanges 30 and 31 have, as shown in FIG. 3, spline teeth 32 formed on their opposing surfaces and are configured so that they can rotate mutually relatively within the extent of a predetermined angle. Between the inner hub flange 30 and the outer hub flange 31 are formed cutouts 33, and in these cutouts 33 are accommodated torsion springs 34, thus, when the inner and outer hub flanges 30 and 31 rotate relatively, torque is transferred via the springs 34 within the cutouts 33 from the outer hub flange 31 to the inner hub flange 30, thus to the hub 20.

To the outer peripheral portion of the main disk plate 40 is fixed a facing plate 42, and to both sides of the plate 42 are fixed friction pads 44 by rivets 43. The main disk plate 40 and the auxiliary disk plate 41 are made into the form of a single body by means of pins 45, and between the hub flanges 30 and 31 are pinched and pressed the hysteresis unit 50. The main and auxiliary plates 40 and 41 thus made into the form of a single body can rotate with respect to the hub 20 up to the movable extent of the pin 45 within the cutout 35 formed in the outer periphery of the outer hub flange 31, and within this extent, torque is transferred successively by means of torsion springs 46 provided between the outer hub flange 31 and the main and auxiliary plates 40 and 41.

The hysteresis unit 50 will now be described with reference to FIG. 2 which is provided between the main and auxiliary plates 40 and 41 and the hub flanges 30 and 31. This hysteresis unit 50 is composed of a centering bush 51, friction material or thrust material 52 (arranged in this order from the side of the main disk plate 40 between it and the hub flanges 30 and 31), belleville spring 53, thrust plate 54, and friction material or thrust material 55 (arranged in this order from the side of the auxiliary plate 41 between it and the hub flanges 30 and 31). This hysteresis unit 50 functions so as to determine the hysteresis of first stage of the torque transfer characteristic curve. Of course, another hysteresis unit 60 for determing the hysteresis of second or higher stages may be provided at a position closer to the outer periphery, but, this unit 60 will not be described further herein because it has no relation to the present invention.

Figure 2:
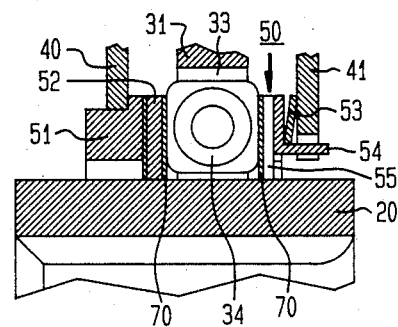
FIG. 2 is a fragmentary enlarged view showing the outer peripheral portion of a hub.

The respective members forming the hysteresis unit 50 have, as shown in FIGS. 2 and 3, such an outside diameter as is able to cover substantially both the torsion section cutout section 33 and the spline section 32 provided between the inner hub flange 30 and the outer hub flange 31.

As shown in FIG. 2, between the thrust material, 52 and 55, positioned in the innermost of the hysteresis unit 50 and the hub flanges 30 and 31 is interposed a substantially annular plate material 70. This plate material 70 has a substantially identical outside diameter with the individual members of the hysteresis unit 50, namely, such an outside diameter as is able to cover both the torsion section cutout section 33 and the spline section 32 provided between the hub flanges 30 and 31, whose bore section conforms to the outer peripheral surface of the hub 20. This is, this bore section is circular at the most part and portion (fixed portion) 73 adjacent to the bottom of the cutout section 33 of the inner hub flange 30 is made straight, hence, the plate material 70 is fixed by the fixed portion 73 in the circumferential direction with respect to the inner hub flange 30, i.e. to the hub 20 so that it can rotate together with the hub 20.

Figure 4:
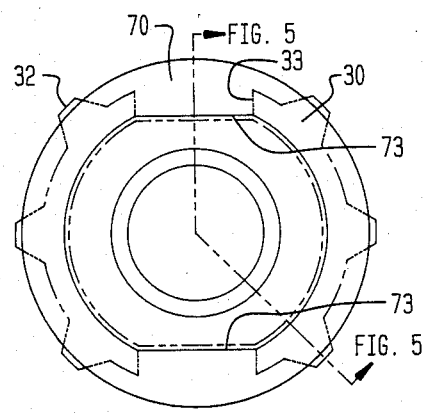
FIG. 4 is a side view showing the relation between plate material and an inner hub flange.
Figure 6:
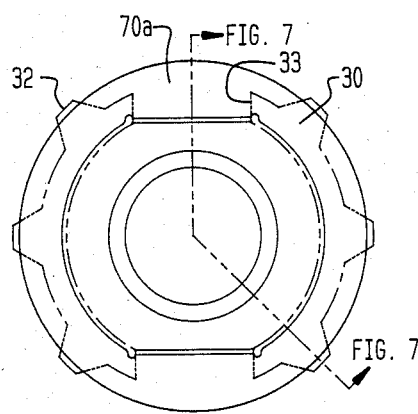
FIG. 6 is a side view showing another embodiment of the plate material.
Figure 7:
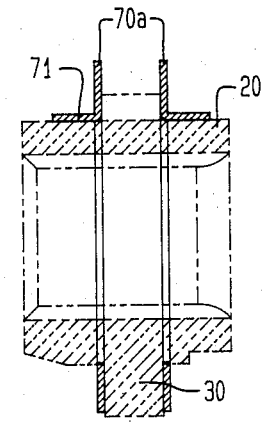
FIG. 7 is a sectional view corresponding to FIG. 6.
Figure 8:
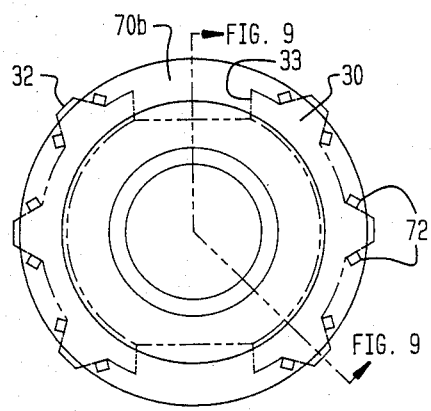
FIG. 8 is a side view showing still another embodiment of the plate material.
Figure 9:
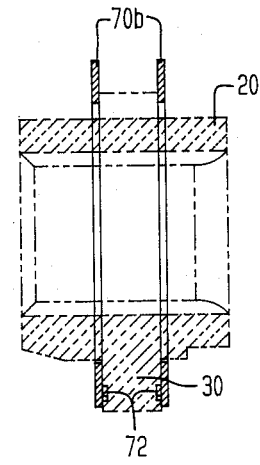
FIG. 9 is a sectional view corresponding to FIG. 8.

FIGS. 6 and 7 show another embodiment 70a of the plate material. This plate material 70a is substantially identical with the plate material 70 of FIGS. 4 and 5, but differs therefrom in that a pawl member 71 extends in the axial direction from the aforementioned straightened bore section. This pawl member 71 is laid on the flat outer peripheral surface of the hub being flush with the bottom of the torsion section cutout 33. Preferably, the pawl member 71 has some resiliency for pressing downward on the outer peripheral surface of the hub to thereby obviate looseness of the plate material. FIGS. 8 and 9 show still another embodiment 70b of the plate material. This plate material 70b has an annular side. This side is squeezed to create projection portions 72, and these projection portions form a fixing section coming into engagement with the side of the tooth tops of the spline 32 of the inner hub flange 30.

In the thus configured clutch disk 10, the torque given from the input side is transferred via the main and auxiliary plates 40 and 41 to the centering bush 51 and the thrust plate 54, and finally to the thrust material, 52 and 55. On the other hand, since the plate material 70 is fixed in the circumferential direction with respect to the hub 20, friction always appears between the thrust material, 52 and 55 and the plate material 70, whereby a stable hysteresis is obtained.

What is claimed is:

1. A clutch disk comprising
a hub to be coupled with a torque output shaft,
an inner hub flange fixed integrally to said hub,
an outer hub flange disposed concentrically on the outside of said inner hub flange and rotatable within the extent of a predetermined angle by means of splines with respect to said inner hub flange,
main and auxiliary disk plates disposed on each side of both said flanges so as to be coupled with a torque input shaft,
hysteresis means including thrust material provided between said main and auxiliary disk plates, wherein
plate material covering a torsion section cutout and a spline section formed between said inner and outer hub flanges is disposed between the thrust material of said hysteresis means and both said hub flanges, and
said plate material having a fixing section for making said plate material rotate together with said inner hub flange.

2. A clutch disk according to claim 1, wherein said plate material fixing section is formed by a flat inner peripheral surface adjacent to a bottom section of the torsion section cutout of said inner hub flange.

3. A clutch disk according to claim 1, wherein said plate material fixing section is formed by a pawl member integral with said plate material which is laid on a flat outer peripheral surface of said hub and flush with the bottom of the torsion section cutout of said inner hub flange.

4. A clutch disk according to claim 1, wherein said plate material fixing section is formed by a squeezed projection section being locked on the side of the tops of the spline section of said inner hub flange.

* * * * *